United States Patent [19]

Kowalski

[11] Patent Number: 5,003,545
[45] Date of Patent: Mar. 26, 1991

[54] METHOD AND APPARATUS FOR GENERATING BOTH A BROADBAND CONTINUOUS WAVE OUTPUT AND A PULSED OUTPUT

[75] Inventor: Frank V. Kowalski, Golden, Colo.

[73] Assignee: Colorado School of Mines, Golden, Colo.

[21] Appl. No.: 226,871

[22] Filed: Aug. 1, 1988

Related U.S. Application Data

[63] Continuation-in-part of Ser. No. 18,016, Feb. 24, 1987, Pat. No. 4,827,480.

[51] Int. Cl.$^5$ .............................................. H01S 3/10
[52] U.S. Cl. ............................................ 372/25; 372/32
[58] Field of Search ....................... 372/20, 25, 28, 32, 372/93, 94, 99

[56] References Cited

U.S. PATENT DOCUMENTS 4,606,031 8/1986 Beene et al. ............................ 372/28
4,700,150 10/1987 Hall et al. ............................. 332/751

*Primary Examiner*—Frank Gonzalez
*Attorney, Agent, or Firm*—Richard W. Hanes

[57] ABSTRACT

The invention relates to the generation of lased light having a broadband spectral content within a frequency-shifted feedback cavity containing a gain medium, a frequency-shifting device and one or more mirrors so arranged that they receive the multiple-frequency output issuing from the gain medium and repeatedly circulate it around the cavity through both the gain medium and frequency-shifter thereby either increasing or decreasing the frequency of the circulating beam by an incremental amount without any Fabry-Perot frequency discrimination, mode production or chirping during each pass. Each frequency-shifted signal is combined with those preceding it to output a modeless beam of broad spectral output. By selectively mismatching the cavity length and the frequency shift per pass, a continuous wave output is assured; whereas, conversely, by phasing the circulating frequency-shifted beams within limits amounting to several percent plus or minus the optimum, a pulsed output results. The inclusion of one or more frequency-selective devices within the cavity substantially enhances the pulse production in the pulsed version of the FSFC.

14 Claims, 8 Drawing Sheets

Fig_1

Fig_2

Fig_3

Fig_5

Fig_6

METHOD AND APPARATUS FOR GENERATING BOTH A BROADBAND CONTINUOUS WAVE OUTPUT AND A PULSED OUTPUT

This invention is a continuation-in-part of my copending U.S. application Ser. No. 018,016 filed Feb. 24, 1987 under the title METHOD AND APPARATUS FOR GENERATING ULTRA-SHORT PULSES WITH A FREQUENCY SHIFTER IN A CAVITY, now U.S. Pat. No. 4,827,480.

BACKGROUND OF THE INVENTION

1. Field of the Invention

The present invention relates to certain improvements in the invention forming the subject matter of my copending application above-identified in which I not only am able to generate short optical pulses brought about by the interference between frequency-shifted waves of different frequencies circulating in an active cavity and fed back into the gain medium during each pass therethrough but, in addition, I am now able to generate a band of light having a broad spectral output. A continuous wave laser is constructed in which the light is shifted in frequency before being fed back into the gain medium. An acousto-optic modulator, an acoustic grating or other type of conventional frequency-shifting device is used inside the cavity to incrementally shift the frequency of the light circulating therein during each pass. A system of one or more mirrors are used within the cavity to circulate the light waves through the frequency shifter and the gain medium with the length of the cavity being selected to have such waves arrive in phase with those preceding it in those instance where a pulsed output is desired.

2. Description of the Related Art

The closest prior art known to me is contained in U.S. Pat. Nos. 3,834,790 to Macken and 4,586,184 to Hess, both of which are of record in my parent application previously identified along with other less pertinent art. An essential feature of the active cavity used in accordance with the teaching of the present invention is that it include a frequency-shifting device, a gain medium and a system of mirrors by means of which the waves of light will circulate therein and have the frequency thereof incrementally increasing or decreasing during each pass without any modes being produced.

Of the two, Macken is the least pertinent of the two. The teaching of the Macken patent is strictly one of coupling a beam of light having a single known frequency into a passive cavity and shifting its frequency therein to one which more nearly matches the reflected beam returning from a moving target such that the beat frequency resulting from the comparison of the two in accordance with the well known Doppler effect will fall within the range of the detection apparatus. Light of a single frequency, shifted or not, is incapable of generating pulses or a continuous wave of broad spectral content; therefore, Macken has nothing to say of any significance to the teaching found herein.

The Hess patent is a complete enigma because my investigation has conclusively established that the set up he illustrates in FIG. 4, for example will not generate a chirped output as he claims. His various embodiments including the one shown in FIG. 4 which most nearly corresponds to mine and includes an active medium in the form of a dye jet pumped with a Krypton laser will not produce a mode structure in his active cavity and the absence of such a mode structure renders the output of a chirped signal impossible. Since my findings are to the effect that such a system is modeless and results in a continuous wave output of broad spectral content, I can only conclude that the systems shown on the Hess patent were merely matters of conjecture and not actually built and tested to prove or disprove his hypothesis. I admit that one experienced in the laser art might expect that a standing wave would exist in such a cavity but, contrary to such an expectation, and to my surprise, none was found. Instead there were no modes in the cavity, the output had a broadband spectral content and at least at the present time I suspect, but have not yet proven, that such a broadband output is pulsed or continuous.

The standard, and insofar as I am aware, the only method for sustaining laser oscillation is through the use of the feedback in a Fabry-Perot cavity. The multiple reflections within this type of cavity lead to destructive interference for most frequencies, however, for the discrete frequencies which correspond to the standing waves of the cavity, the interference is constructive and the intensity becomes quite large.

The dominant characteristic of this type of laser is that the output power is distributed in a narrow spectral region, the modes of the cavity. In my system, on the other hand, a modeless continuous or pulsed wave laser is constructed in which the spontaneously emitted light from the dye jet of a dye laser provides the broadband input to the frequency-shifted feedback cavity instead of light of one or more discrete frequencies coupled into a passive cavity from an external source. When this is done, there is no Fabry-Perot frequency discrimination because the interference from multiple reflections which takes place is between waves of different frequencies and, as a result, there is no mode structure as the prior art according to Hess would incorrectly suggest. The broadband spectrum of the spontaneously-emitted light is fed back into the gain medium with no frequency discrimination apart from the dispersive effects of the acoustic grating or other diffraction medium. Accordingly, an optical spectrum analysis of the light circulating within the cavity will show the same pattern for each frequency circulating therein which fact shows that the frequency-shifted feedback cavity does not selectively attenuate input frequencies like a Fabry-Perot interferometer does. Once again, the prior art teaching found in Hess suggests that such a frequency-shifted feedback cavity will filter and thus selectively attenuate the input frequencies in the same manner as the Fabry-Perot interferometer, however, I find that this is not the case and the laser will, in fact, oscillate with a broad spectral output especially when the output is continuous and it may well even do so when it is pulsed. I can generate pulses of varying rate as well as enhance overall pulse production by incorporating within the cavity along with an active medium some type of frequency selective element or elements.

SUMMARY OF THE INVENTION

It is, therefore, the principal object of the present invention to provide a novel and improved method and apparatus capable of generating a broadband spectrum without having to sustain the laser oscillations using the feedback in a Fabry-Perot cavity.

A second objective is to provide a system of the type aforementioned wherein a pulsed laser is produced in which only light that has been frequency-shifted by an acousto-optic modulator or similar frequency-shifting device is fed back into the gain medium and the pulsed output is further enhanced by the inclusion within the cavity of a frequency-selective device.

Another object of the within-described invention is to generate a broadband output which has no mode structure and is, therefore, free of any Fabry-Perot frequency discrimination, chirping or filtering.

Still another objective is that of essentially being able to control the output in such a way that it is either pulsed or continuous by the simple, yet unobvious, expedient of either matching the length of the cavity to the frequency shift of the frequency-shifting device such that the frequency-shifted waves circulating therein arrive in a phased or additive relationship or, alternatively, intentionally mismatching these two parameters so that the waves arrive at the frequency-shifter out of phase thus avoiding a pulsed output in those instances where a continuous wave is preferred.

An additional object is to provide a method and apparatus which will output pulses of varying duration due to the inclusion within the cavity of one or more frequency selective elements along with an active medium.

Further objects of the invention herein disclosed and claimed are to provide a frequency-shifted feedback laser which, among other applications, is useful in various types of length measurement devices where extreme accuracy is needed and as well as in the spectral identification of trace elements and the like.

Other objects will be in part apparent and in part pointed out specifically hereinafter in connection with the description of the drawings that follows.

DESCRIPTION OF THE PREFERRED EMBODIMENTS

Up until now, the standard method for sustaining laser oscillation is through the use of feedback in a Fabry-Perot cavity and all continuous wave lasers operate in this manner. While, as previously noted, multiple reflections within the cavity lead to destructive interference for most frequencies, nevertheless, certain discrete frequencies exist which correspond to the standing waves of the cavity and thus add to one another constructively thereby outputting energy in accordance with the modes of the cavity. Because of this modal arrangement, however, this output power is distributed in a very narrow spectral region.

In my previous application I constructed a system for generating short optical pulses in which the light entering the cavity was internally reflected and repeatedly passed through a frequency-shifting device which incrementally changed its frequency during each pass. Quite unexpectedly, I have discovered recently that there was no Fabry-Perot frequency discrimination in my system, apparently because the frequency-shifted feedback cavity does not selectively attenuate or otherwise favor certain frequencies over others. This meant that no longitudinal modes were Present to narrow the spectral output as has been the case up until now and the surprising result was that the light output from my system is distributed over quite a broad, as opposed to a very narrow, spectral region.

I am, as yet, unable to confirm with certainty that the broadband spectral output does not also take place in the pulsed version of my system; however, in order to prove that it at least took place during the generation of a continuous wave, instead of selecting a cavity length reasonably closely matched to the shift in frequency taking place during each pass through the frequency-shifter so as to phase each succeeding frequency-shifted wave with the ones before it and produce a pulsed output, I chose to intentionally mismatch the cavity length and frequency change of the frequency shifter.

Figure 1:
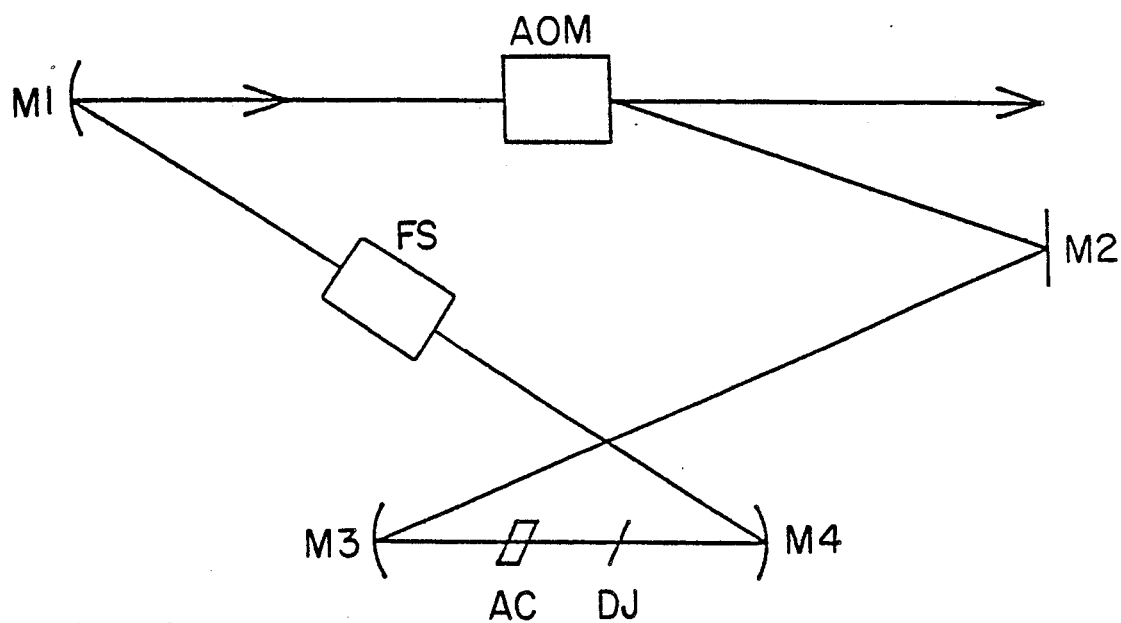
FIG. 1 is a schematic showing a pulsed ring dye laser in which the light consisting of an R&G dye pumped by a continuous-wave argon-ion laser is shifted in frequency using an acousto-optic modulator as the frequency-shifting medium before being reflected back into a gain medium.

Specifically, the laser DJ I use to generate the broadband of light is shown schematically in FIG. 1. It consists of the optics from a Spectra-Physics Model 380 ring dye laser which was pumped by an argon-ion laser (Spectra-Physics Model 171-08). The mirror separations are: M1 to M2, 57 cm.; M2 to M3, 34 cm.; M3 to M4, 8.5 cm.; and, M4 back to M1, 34.5 cm. The frequency-shifting device consisted of an acousto-optic modulator (AOM) which was an Isomet Model 1211 operating from 100 to 120 MHz. Other conventional frequency-shifting devices can, of course, be substituted for the acousto-optic modulator such as, for example, a moving diffraction grating moving parallel to the face of the beam, both of which are well known in the art and their use and function is well known to practitioners of the optical arts. No novelty is, therefore, predicated upon the particular means used for repeatedly incrementally increasing or decreasing the frequency of the broadband input to the cavity, but rather the fact that the system is so designed that the beam circulating within the cavity is, in fact, changed in frequency by a known predetermined increment $\Omega$ during each pass. Another requirement, of course, is that the length of the cavity (L) either be approximately matched within a range of a few percent to the change in frequency brought about in the frequency-shifter (AOM) such that each frequency-shifted wave arrives in some predetermined phased relation to those before it if a pulsed output is desired or, alternatively, to selectively mismatch these two parameters if a continuous wave output is what one wishes to achieve. If, therefore, the cavity length (L) has been reasonably closely matched to the frequency $\Omega$, the superposition of these waves will lead to an intensity in the frequency-shifted feedback cavity which is a time-dependent Airy function.

In calculating the cavity length (L) in terms of the incremental change in frequency brought about during each pass through the frequency-shifter (AOM), the following equation is used:

$$2n\pi/n' = \Omega L/c$$

where "n" and "n'" are integers, "L" is the round-trip path length in meters, "c" is the speed of light in meters and "$\Omega$" is the frequency in radians per second. Failure to exactly phase these two parameters is not critical as I have discovered that a deviation of even five percent has little effect upon the pulsed output of the system. It could well be that with the shorter cavity lengths, even a higher percentage deviation could be tolerated without adversely affecting the pulsing capacity of the system. In addition, I have found that I can use cavity lengths which are fractions of the length necessary for generating the time-dependent Airy function. Specifically, it should suffice to point out that a cavity having half the path length (n=1 and n=2) used with a highly efficient frequency-shifter like the acousto-optic modulator described above outputs single pulses having periods.

Continuing with the continuous wave modeless broadband output aspects of my system, the maximum efficiency in coupling light into the first order diffracted beam is 95% at 110 MHz. The output consists of the zeroth order beam from the acousto-optic modulator AOM. The modulator is 25 located between mirrors M1 and M2 a distance of 29.5 cm from M2 and can be rotated about an axis perpendicular to the plane of FIG. 1. The laser can be made to operate either bidirectionally, in a clockwise traveling wave or in a counterclockwise traveling wave depending upon slight adjustments made in this rotation angle. Whether the wave circulates in both directions at the same time, clockwise or counterclockwise, however, is of no consequence insofar as the generation of a broadband or even a pulsed output is concerned; therefore, no useful purpose would be served by going into detail on how this is accomplished. The significant thing to note is that these mirror spacings, the location of the frequency-shifter AOM, its orientation and the placement of the gain medium DJ are such that the circulating waves are purposely mismatched to the frequency shift taking place in the AOM thus favoring a continuous wave output as opposed to a pulsed one. FIG. 1 also shows an astigmatism compensator AC in the cavity as well as a frequency-selective device FS, the latter being especially beneficial in the pulse generation aspects of the system which will be described in detail presently.

The output beam was analyzed using an avalanche photodiode (Newport Model 877, 1.7 GHz bandwidth and a Tektronix model 7904 oscilloscope with a 7A19 600 MHz bandwidth amplifier) and an autocorrelator (Spectra-Physics model 409 with a range of 80 to 0.5 picoseconds) and observed to have a Gaussian profile. To determine the spectral content of the output, several experiments were performed using a Model 70-000, 3.4 meter Jarrell-Ash spectrograph. The entrance slit was set at 40 microns for all of the following experiments.

Figure 2:
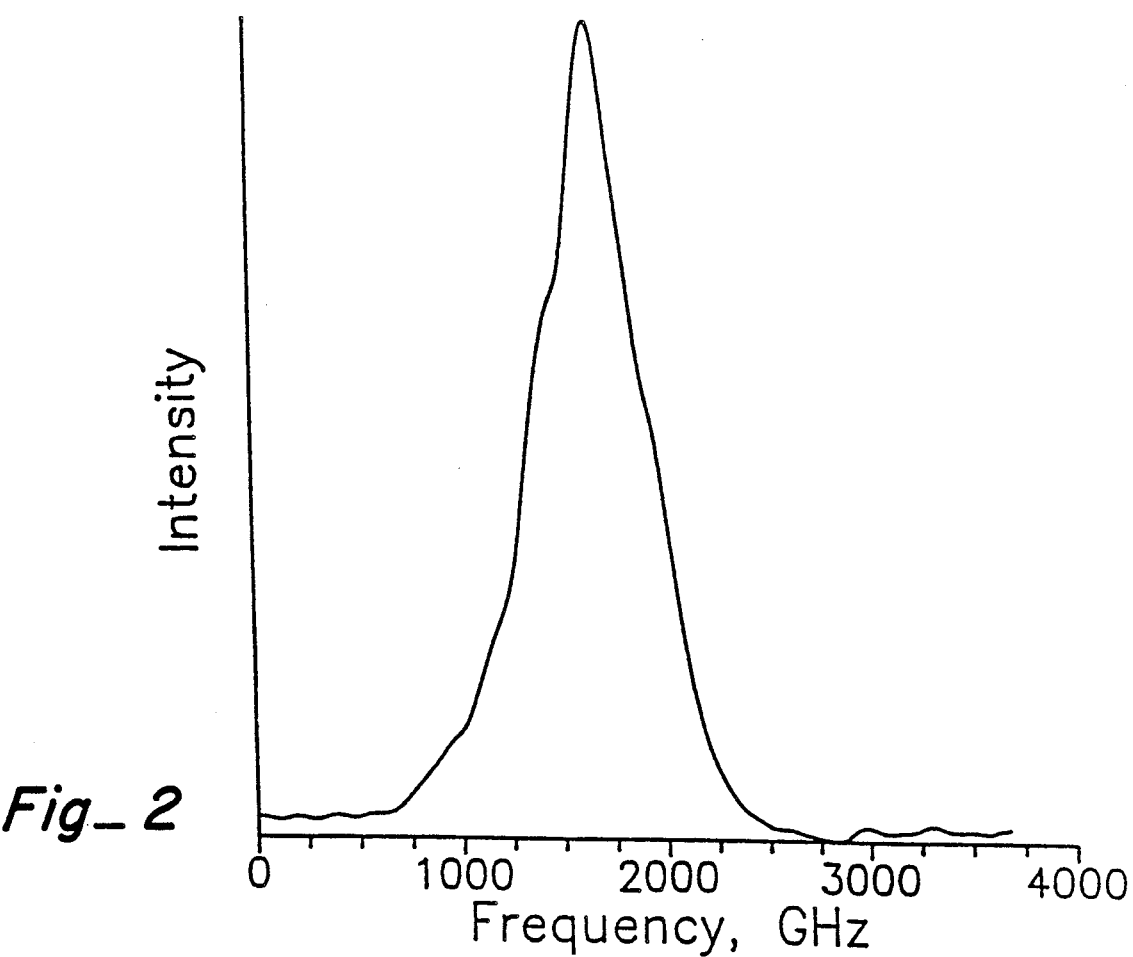
FIG. 2 is a plot of the spectrograph output.

In the image plane of the spectrograph was placed a 1024 element photodiode array (Reticon model RL 1024G with a 24 micron diode center to center spacing). A 590 groove/mm grating was operated in a second order giving a dispersion of 2.5 A/mm. FIG. 2 shows the output of this array when the spectograph was illuminated by the laser of FIG. 1. The full width, half maximum (FWHM) was 7.5 Angstroms at 5900 Angstroms thus clearly demonstrating a continuous distribution of energy across the output beam. The laser was tunable over the bandwidth of the dye by tilting the acousto-optic modulator (AOM) or the mirrors. Precisely the same spectograph illuminated by a He-Ne laser yielded an FWHM peak which was determined entirely by the image of the slit of 3 pixels or 72 microns which corresponds to a 0.18 Angstrom or 15 GHz resolution.

When a 60 micron exit slit was placed at the image plane of the spectograph, the light that passed through this slit was used to illuminate a variable length Fabry-Perot interferometer with a finesse of 10. By increasing the plate separation, the visibility of the ring pattern decreased, however, I found no indication of discrete frequencies in the fringe pattern nor was the fringe pattern time-dependent, therefore, no modes were present. At 1.2 cm., the fringes were no longer visible.

In an effort to increase the resolution, the Fabry-Perot interferometer was replaced by an optical spectrum analyzer (Spectra-Physics Model 470-03 with a 2 GHz free spectral range (FSR) and a finesse of 150) and increased the exit slit width to 200 microns. In order to assure alignment of the spectrum analyzer, the dye laser beam and a He-Ne laser beam were combined using a beam splitter (PMS Electro-Optics Model LSYR-0020 at 594.1 nanometers). The two beams then traveled co-linearly over an 11 meter path before entering the spectograph. Both beams came through the exit slit with relative intensities of 2 for the He-Ne laser and 1 for the dye laser when the dye laser was tuned to the same wavelength as the He-Ne laser. A photomultiplier was used to detect the light which passed through the spectrum analyzer. Alignment of the spectrum analyzer was based upon the transmission of the He-Ne laser beam through the spectrum analyzer. To compare the through-put of the dye laser beam with the He-Ne laser beam, a neutral density filter was placed in front of only the He-Ne laser. This reduced its intensity by a factor of 100. The spectrum analyzer was then scanned over two orders at a rate of 50 msec/scan. The output of the spectrum analyzer was constant at 1.8 mV with just the dye laser beam as the input. The output of the spectrum analyzer with just the He-Ne laser beam as the input was an Airy function with a peak value of 1.8 mV.

The foregoing points up the differences between the dye laser and the He-Ne laser. The dye laser has its power distributed over a large spectral region and as a result the power in the 14 MHz (FWHM) band pass of the spectrum analyzer is small. For instance, 1 mW of broadband light incident upon a spectrum analyzer having a finesse of 150 would result in an output power through the spectrum analyzer of 0.007 mW. The He-Ne laser by way of contrast has all of its power distributed within the band-pass of the filter. Two milliwatts of He-Ne light incident on the spectrum analyzer would result in an output power of 2 milliwatts. What I have said above assumes that the spectrum analyzer has no losses. Accordingly, an attenuation factor of order 100 would have to be introduced in the He-Ne beam to have the power transmitted through the spectrum analyzer for the He-Ne and the dye lasers to be equal. This is precisely what I observed.

A modification of the experiment just described permitted a measurement to be made of the heterodyne signal between the He-Ne and dye beams. The spectrum analyzer was replaced with the same avalanche photodiode described previously and a polarizer was placed in both beams so that their polarization states were the same. In this experiment, I used a 43 micron exit slit. A radio frequency spectrum analyzer (Hewlett Packard model 8558 B, 0.1 to 1500 MHz coverage) was used to measure the output of the photodiode. Only a slight increase in the noise level was observed when both beams were present.

Figure 3:
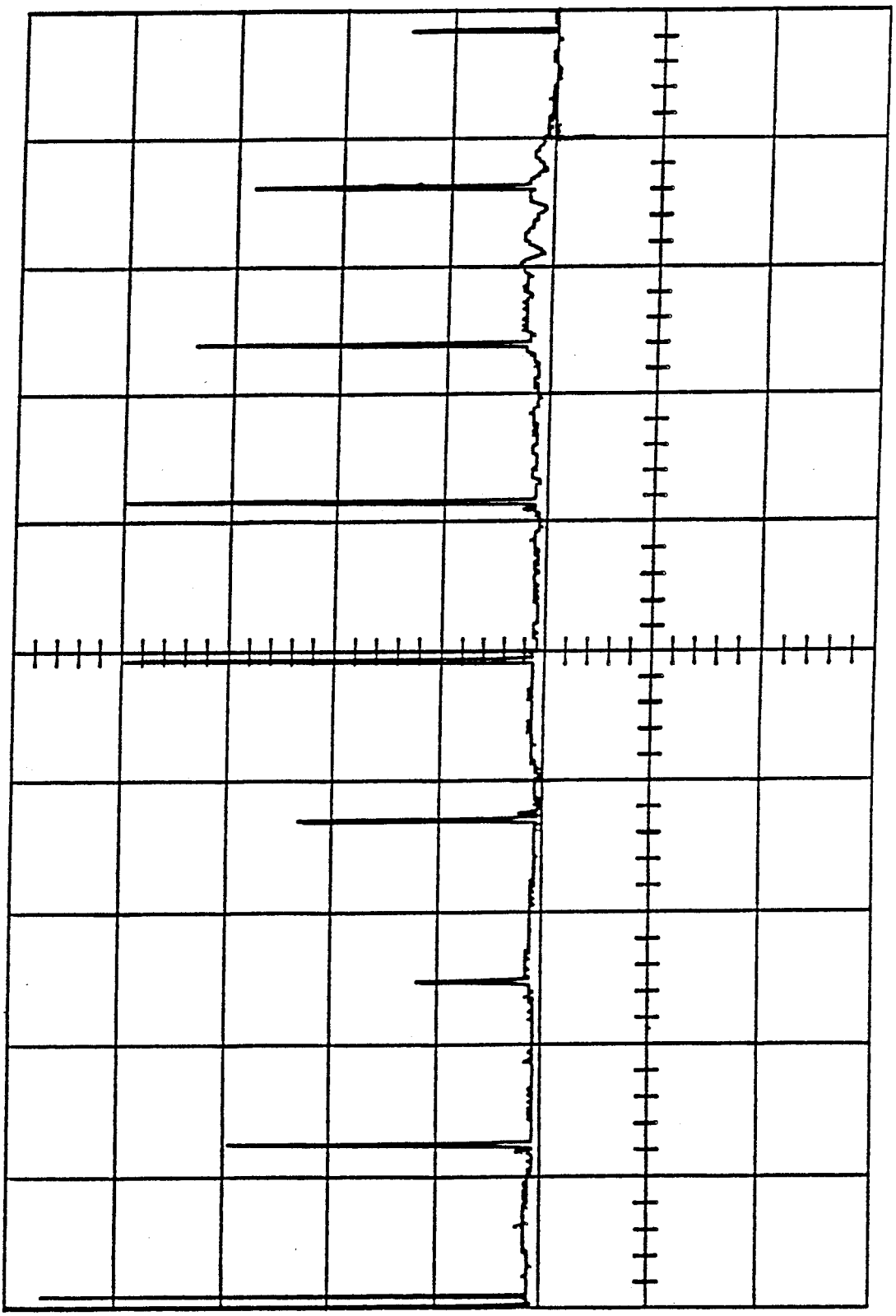
FIG. 3 is a plot of the radio frequency intensity fluctuations near to the threshold.
Figure 4:
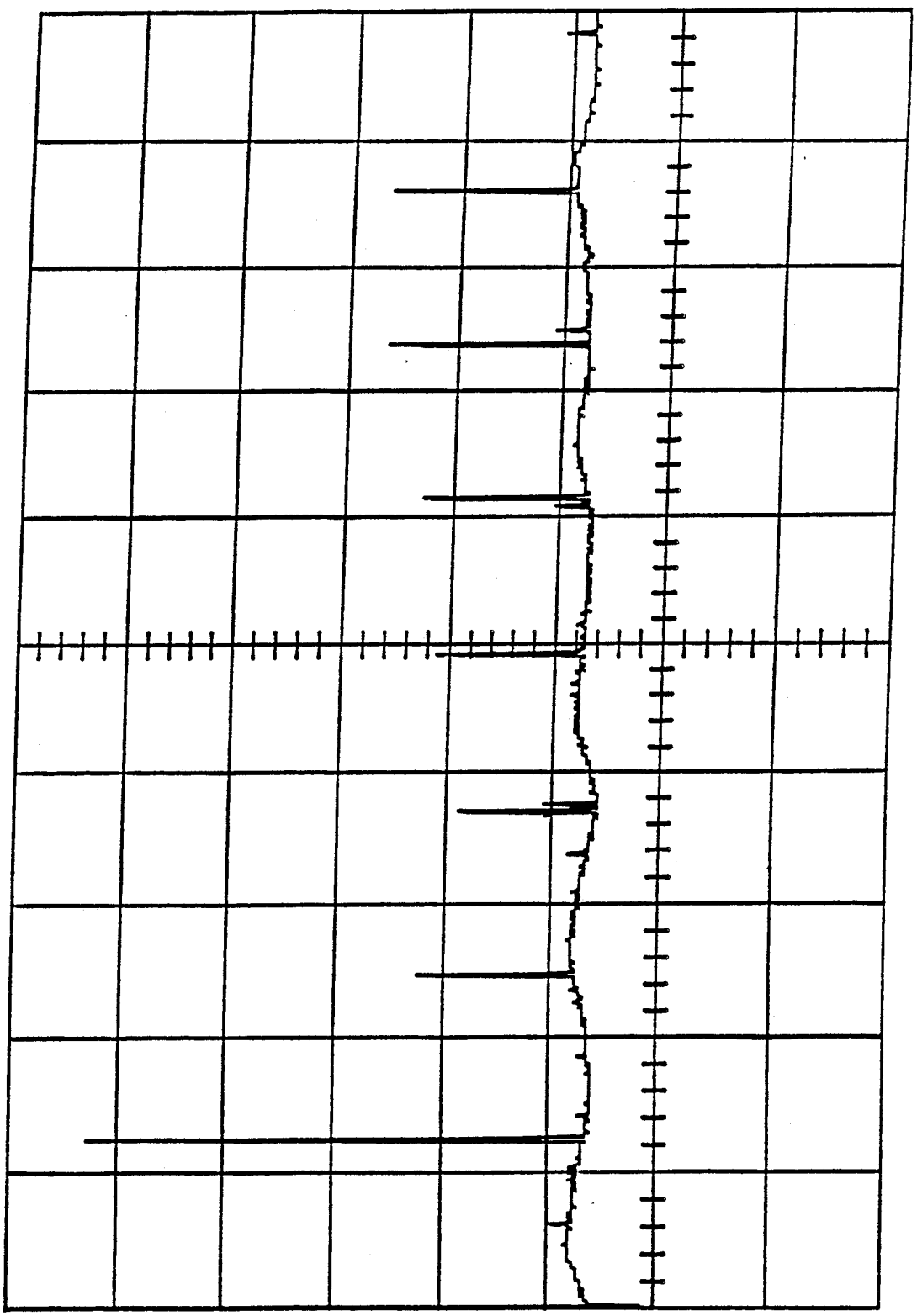
FIG. 4 is a plot of the radio frequency intensity fluctuations far from the threshold.

The following experiments involving measuring the output intensity of the dye laser directly with the avalanche photodiode and an r.f. spectrum analyzer (Tektronix model 2753P). FIGS. 3 and 4 show r.f. intensity fluctuations near and far from threshold, respectively. It should be noted that the intensity fluctuations far from threshold are two orders of magnitude smaller than those near threshold. The output, therefore, consists of small oscillations on a large DC background intensity.

Figure 5:
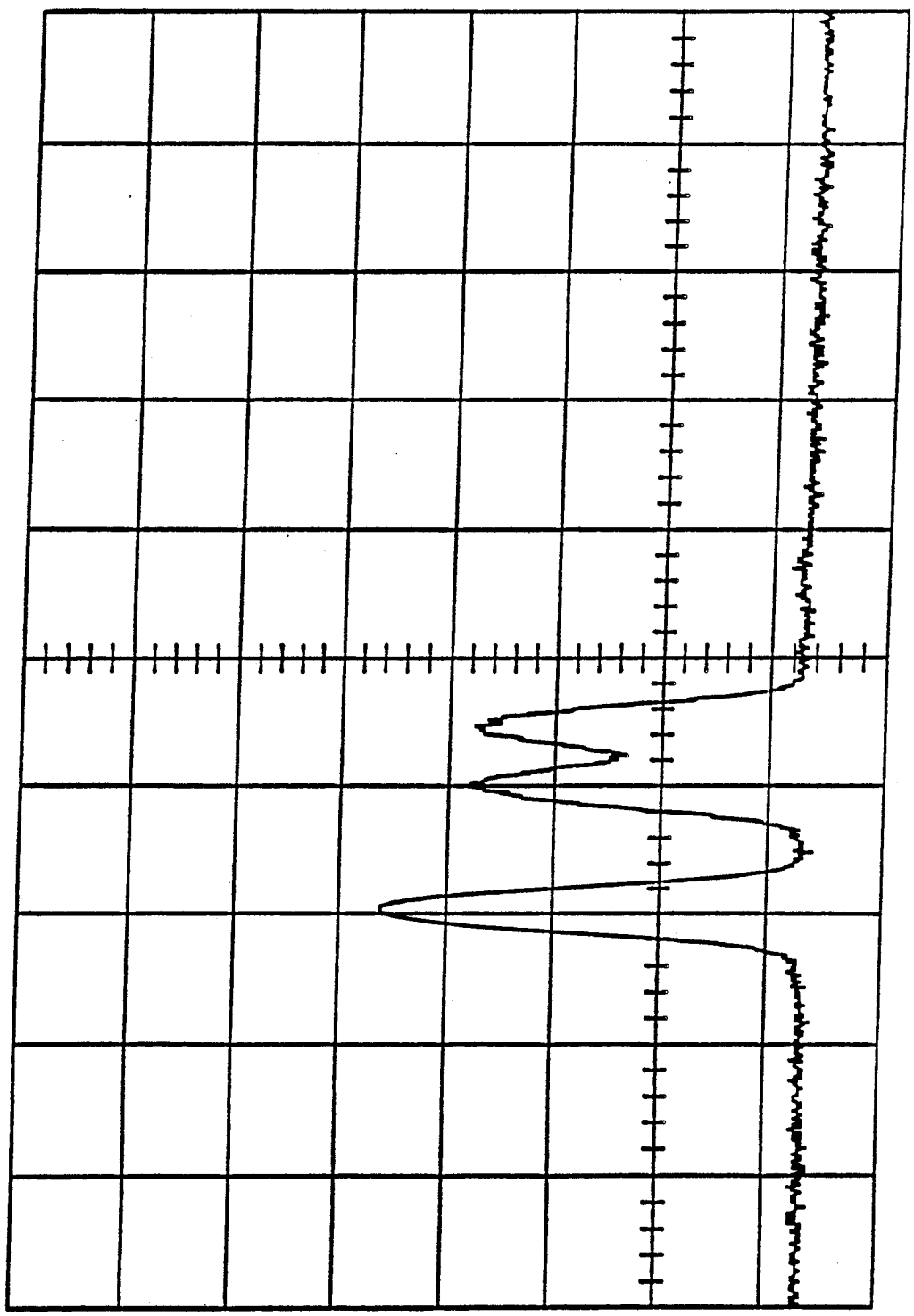
FIG. 5 is another plot of the radio frequency intensity fluctuations far from the threshold like in FIG. 4 but to a different scale.

FIG. 5 shows an expansion of the horizontal axis for the beat at 220 MHz. The peak at 218 MHz is twice the acousto-optic modulator frequency and it moves as the frequency of the latter is varied. The other two peaks move as the lasers length, "d", is varied and are centered at "c/d" where "c" is the speed of light in meters. Similar r.f. spectra were observed through the 43 micron output slit of the 3.4 m spectograph.

Use of an uncoated thin etalon as a frequency-selective device (FS in FIG. 1) in the laser cavity once again resulted in broadband oscillation at the band-pass of the etalon with no chirping contrary to what was reported by Hess. Insertion of a 1200 GHz (FSR) etalon resulted in between 2 and 15 lines oscillating. The number of lines depended primarily upon the alignment of the etalon. Each line was separated by 12 GHz and had a width of 60 GHz. Insertion of etalons of different FSR and finesse resulted in many peaks separated by the FSR. Generally, the frequency range was increased by the insertion of an etalon.

By inserting 1200 and 1160 GHz FSR etalons, it was possible to force the oscillation to occur in one line of width 40 GHz, however, it was difficult to prevent short pulses from being generated.

One might expect that the output beam would be frequency chirped since the acousto-optic modulator provides a frequency shift for each pass through the frequency-shifted feedback cavity. For instance, spontaneously emitted light at one end of the gain profile of the laser might be amplified and then chirped through the gain profile. Presumably, this process would be repeated after the first chirp had progressed through the gain profile. Quite unexpectedly, my experiments showed this was not what happened.

If as Hess maintains, the output was chirped, the slit image at the exit plane of the spectograph would sweep spacially with the frequency chirp and, as a result, the intensity transmitted through the exit slit would be pulsed. Quite to the contrary, I observed virtually no difference in the time-dependence of the intensity between the light entering and exiting the spectograph. The foregoing observations were made with the r.f spectrum analyzer and the fastest of the oscilloscopes previously described.

The second of the experiments that discounts a frequency chirp is what one sees when observing the static fringe pattern from the Fabry-Perot interferometers. A frequency chirp would result in a time-dependent fringe pattern and I saw none.

Figure 6:
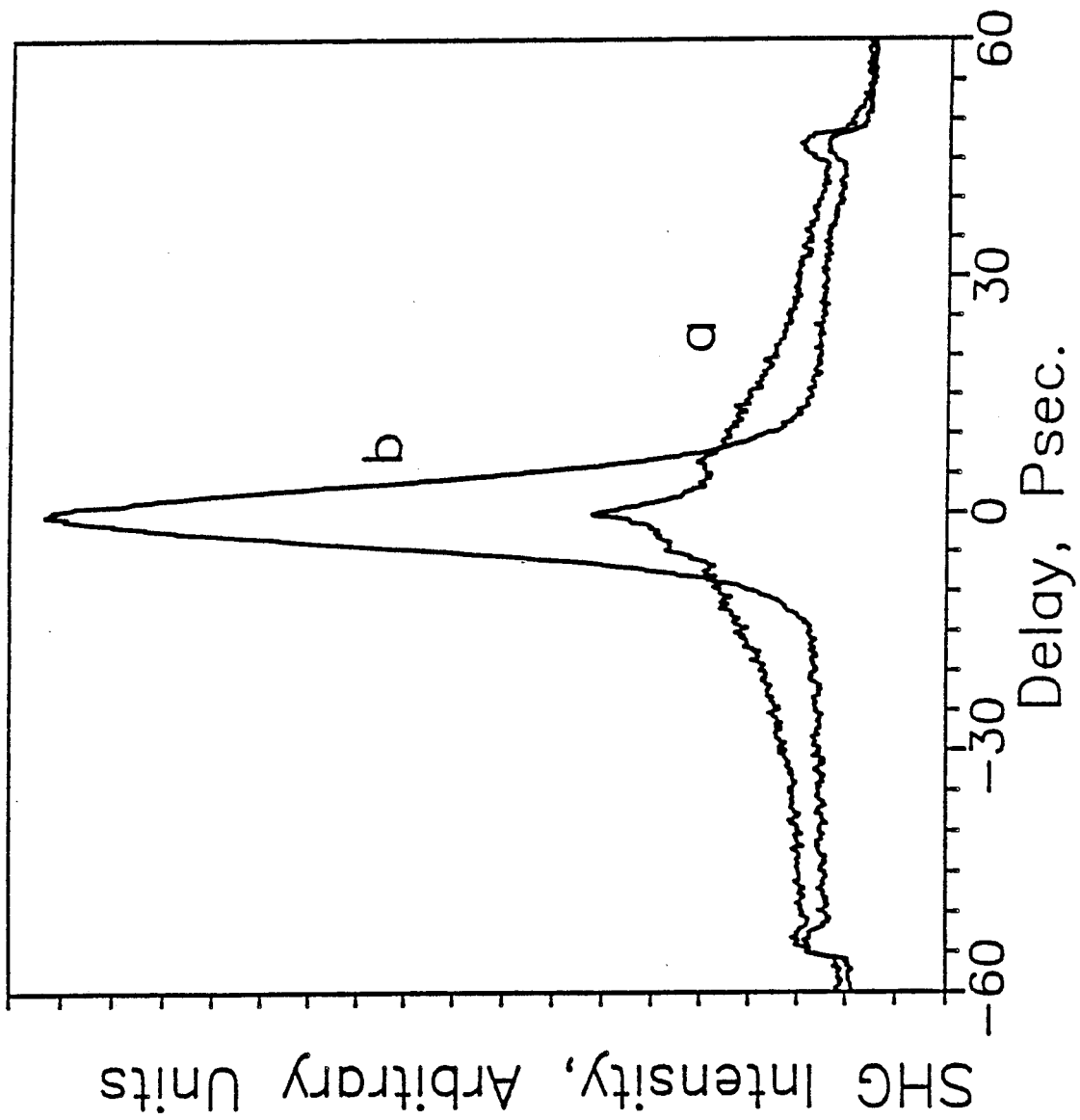
FIG. 6 shows two traces, the first of which "a" is the autocorrelator output of the laser of FIG. 1 while the second "b" shows the same system with a frequency-selective device in the form of a thin etalon inserted into the laser.
Figure 7:
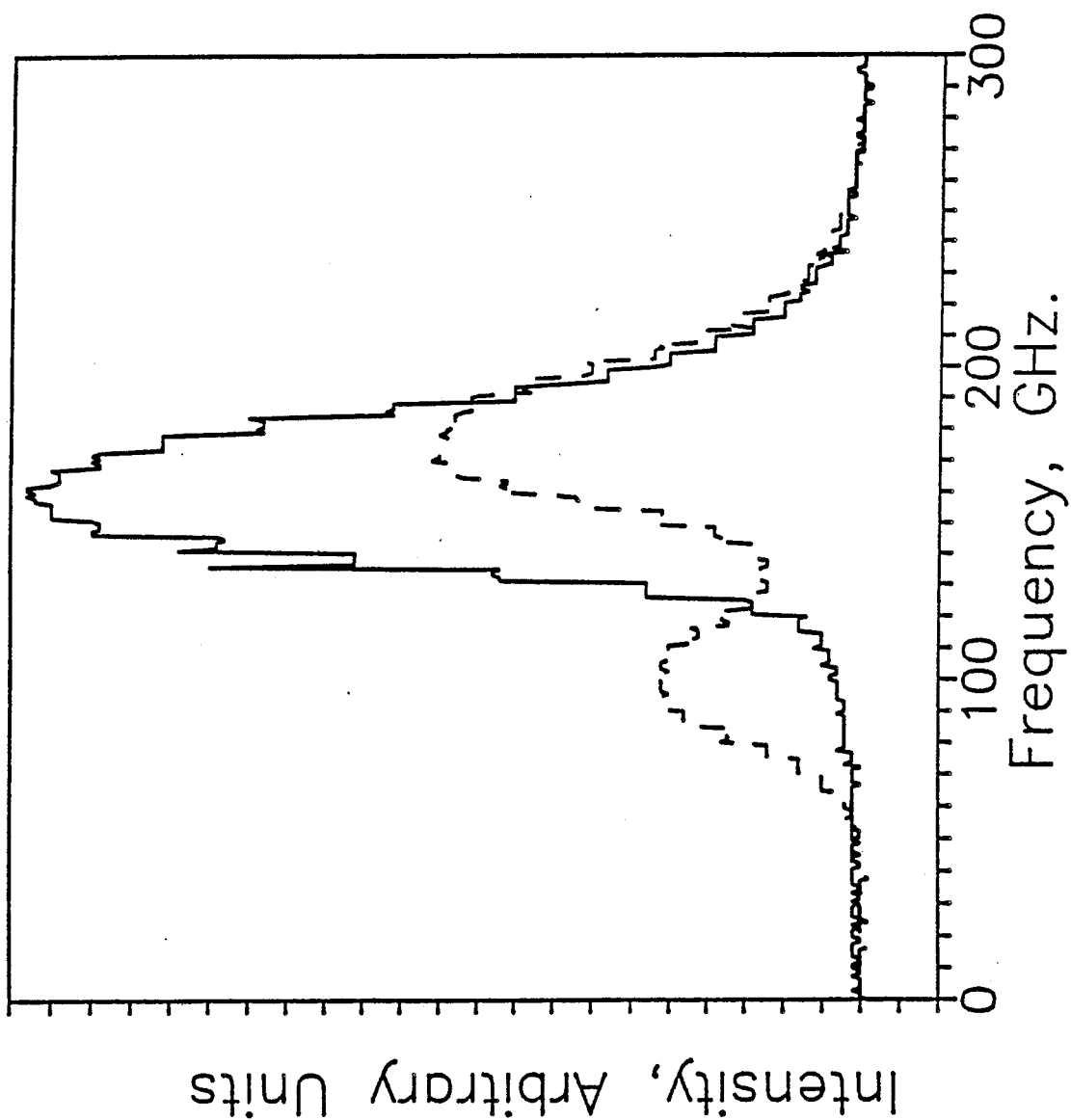
FIG. 7 shows two spectral outputs of the FIG. 1 laser, the solid line one being the output for stable pulse generation and the one shown in dashed lines being that generated when a transition is being made to another pulsed repetition rate; and, FIG. 8 is the r.f. spectrum of the avalanche photodiode output when the laser of FIG. 1 is generating short pulses.

Finally and conclusively, the fact that a continuous broadband emission from this dye laser is further supported by the passive behavior of the frequency-shifted feedback cavity (FSFC) of FIG. 1. For a single frequency injected into the aforementioned cavity, the output intensity varies in time, however, this cavity provided no frequency discrimination. Instead, the output beam has the same characteristics in the frequency domain for all input frequencies. In other words, the output consists of the fundamental frequency plus frequencies which are integral multiples of the acousto-optic modulator's frequency (see FIG. 4, 5 and 6 of my earlier application). This is very different from a Fabry-Perot cavity with a single frequency input where the output is constant in the time-domain but the cavity acts like a bandpass filter in the frequency domain. Thus, the study of the passive cavity and the experimental results presented above confirm the conclusion that the broadband spontaneously-emitted light is amplified without frequency discrimination.

Referring next to FIGS. 1 and 6–8, I will describe briefly the operation of the frequency-shifted feedback cavity of FIG. 1 with different operating parameters to produce a broadband pulsed output with emphasis on the improvements made in the pulsed system over that described and claimed in my earlier application already identified, specifically in the area of incorporating one or more intracavity frequency selective devices FS to enhance the pulsed output in an active cavity as opposed to a passive one.

It is worth noting in the beginning that the operation of a FSFC with a gain medium inserted is considerably more complicated than is the passive cavity. One reason for this is that the spontaneous emission from the gain medium DJ presents a broadband input rather than the single frequency input or the multiple single frequency inputs of my pending application. In addition, as I pointed out before, the lack of longitudinal mode structure results in no frequency discrimination in this cavity, therefore, one cannot "mode lock" a laser constructed from a frequency-shifted feedback cavity. Mode structure in a normal cavity is, of course, generated by interference between waves of the same frequency, thus, when I use phased waves of different frequencies there is no mode structure at all.

All the components of the cavity are the same as those previously described except that the output coupler of the dye laser DJ was replaced by a high reflector and I introduced into the cavity along with the active medium DJ, a frequency-selective element FS such as, for example, a Fabry-Perot, a Michelson interferometer or one or more etalons. The mirror spacings were also changed to provide a cavity length phase-matched to the frequency shift taking place in the AOM in order that each frequency-shifted beam will be in some phased relation to those preceding it and thus generate pulses. Specifically, when the frequency of the acousto-optic modulator AOM was adjusted to c/2L, optical pulses were detected by the autocorrelator as seen in trace "a" of FIG. 6. Inserting a 1585 GHz FSR uncoated thin etalon in the FIG. 1 cavity resulted in the autocorrelator output shown in trace "b".

When using a single etalon, it is difficult to maintain oscillation in one line for long periods of time, however, by inserting two etalons, it is possible to force stable oscillation to occur in one line. Furthermore, by using combinations of two uncoated and one coated thin etalons, the bandwidth of the single line can be varied. Pulses with autocorrelation traces similar to trace "b" are then seen. The FWHM of the autocorrelation trace is 29.2, 12.6 and 9.6 picoseconds for bandwidths of 34, 63 and 85 GHz, respectively. Such results indicate transform limited pulses.

The pulse period is adjustable by varying the r.f. power to the AOM or the Argon pump power. Periods observed for increasing r.f. power expressed in nanoseconds are 4.5, 2.27, 1.52, 1.14 and 0.91 with the autocorrelator trace remaining essentially the same as that of the aforementioned trace "b". The spectral output just before making a transition to another period is shown as the dashed line in FIG. 7. The spectral output following this transition is shown as the solid line in FIG. 7. With two watts of pump power at 514.5 nm, the average output power expressed in mW for the above periods is 22, 32, 40, 48 and 70, respectively. By increasing the r.f. power further, the average output power can be increased up to 160 mW with pulses similar, once again, to those of trace "b" in FIG. 6 observed on the autocorrelator, but, with no pulses being observed on the sampling unit. This is due to the trigger limitations of the sampling unit. The single pulse autocorrelation trace remained for a 5 MHz variation in the AOM frequency.

Figure 8:
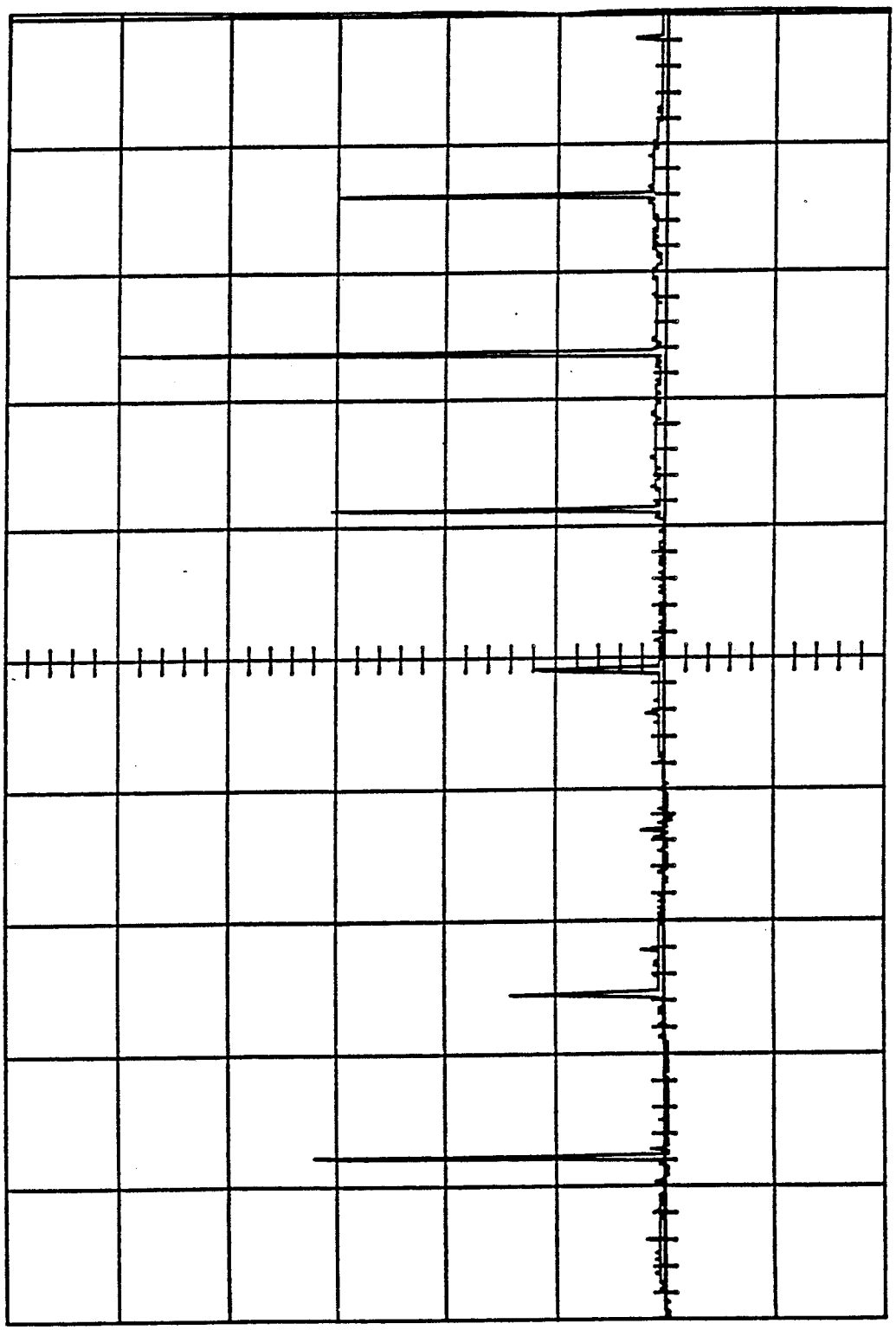

An r.f. spectrum analysis of the avalanche photodiode output using the previously described Tektronix spectrum analyzer when the laser is generating short pulses is shown in FIG. 8. The vertical scale is 10 dB/div. while the horizontal scale is 180 MHz/div. with the center at 900 MHz. As the pulse repetition rate varies, the pattern which is centered at 1314 MHz shifts to either lower or higher frequencies. The central peak in this pattern was observed to shift as high as 1759 MHz which is near the resolution of the analyzer. The corresponding pulse period is 0.569 nanoseconds.

When not pulsing, the r.f. spectrum consists of peaks that are similar in height and spaced apart by 220 MHz. The peak heights are more than 20 dB below the largest peak observed when the laser is generating pulses. A higher resolution spectrum of the 220 MHz r.f. peak reveals three peaks. One corresponds to the frequency of the AOM and is narrower than the 3 KHz resolution of my analyzer. The frequency of the other peaks is related to the round trip distance of the laser. These peaks are generally 25 KHz wide and are 20 dB below the AOM peak. When the laser is generating short pulses, these peaks disappear leaving only the AOM peak.

It can be seen, therefore, that the inclusion of one or more intracavity frequency selective elements have a pronounced beneficial effect on pulse generation, especially in an active cavity containing a frequency shifter wherein only the frequency-shifted light is fed back through the gain medium by way of contrast with all other lasers which feedback only unshifted frequencies of light. In the pulsed aspect of the above-described pulsed ring dye laser, I have been able to generate optical pulses with a 9.6 picosecond FWHM of the autocorrelation trace and measured periods as short as 0.9 nanoseconds.

What is claimed is:

1. A method for generating a beam of lased light having a broad spectral content which comprises the steps of: generating a beam of lased light by pumping a gain medium within a frequency-shifted resonant feedback cavity containing a frequency shifting means for incrementally shifting the frequency of a light beam as it passes through the cavity, repeatedly reflecting the generated frequency-shifted beam back through the gain medium and into the frequency-shifting means using one or more mirrors within the cavity, and combining each frequency-shifted beam which leaves the frequency-shifting means with those preceding it to form a broadband beam free of longitudinal modes or Fabry-Perot frequency discrimination.

2. The method as set forth in claim 1 wherein the beam generated within the gain medium comprises spontaneous emissions of many frequencies.

3. The method as set forth in claim 1 wherein the mirror or mirrors are so angled and spaced relative to one another in relation to the frequency shift taking place in the frequency-shifting means that each frequency-shifted beam circulating within the cavity arrives at the frequency-shifting means in phased relation to those preceding it, thereby producing a pulsed output.

4. The method as set forth in claim 1 wherein as each frequency-shifted beam circulates within the cavity it is enhanced by filtering the beams through a frequency-selective device.

5. The method as set forth in claim 1 wherein the frequency-shifting means brings about an incremental shift in each frequency of light entering the cavity by using an interfering wave.

6. The method as set forth in claim 1 wherein the frequency-shifting means brings about an incremental shift in each frequency of light entering the cavity by using an interfering light wave.

7. The method as set forth in claim 1 wherein the gain medium comprises a dye jet laser pumped by a pulsed-ion laser.

8. The method as set forth in claim 1 wherein the mirror spacings are selected relative to one another end to the frequency shift of the frequency-shifting means such that each frequency-shifted wave reaches the frequency shifting means out of phase with those waves preceding it.

9. The method as set forth in claim 3 and further including the step of passing each frequency-shifted beam through a frequency-selective device as ti circulates within the cavity.

10. The method as set forth in claim 3 which further includes the step of changing the power supplied to the gain medium or the frequency-shifting means or both.

11. Apparatus for generating a wave of lased light of broadband spectral output which comprises: a frequency-shifted resonant feedback cavity containing a gain medium means for pumping said gain medium for generating an input beam made up of multiple frequencies of lased light, frequency-shifting means for incrementally shifting the frequency of light entering the cavity, and a plurality of mirrors angled relative one to another and to the gain medium and the frequency-shifting means so that the input beam and each frequency-shifted counterpart of the input beam is repeatedly recirculated through both the gain medium and the frequency-shifting means combining each frequency-shifted beam with the beams preceding it without any Fabry-Perot frequency discrimination or longitudinal mode production.

12. The apparatus as set forth in claim 11 in which the mirror or mirrors are so spaced relative to one another and to the gain medium and the frequency-shifting means that each successive frequency-shifted wave circulating in the cavity arrives at the frequency-shifting means in phased relation to the waves preceding it so as to produce a pulsed light output.

13. The apparatus as set forth in claim 11 in which the mirror or mirrors are so spaced relative to one another and to the gain medium and the frequency-shifting means that each successive frequency-shifted wave circulating in the cavity arrives at the frequency-shifting means in out-of-phase relation to the waves preceding it so as to produce a continuous wave output.

14. The apparatus as set forth in claim 12 in which the cavity includes frequency-selective means positioned and adapted to intercept and enhance each light pulse as the frequency-shifted waves circulate through the cavity.

* * * * *